United States Patent [19]

Kim et al.

[11] Patent Number: 6,021,237
[45] Date of Patent: Feb. 1, 2000

[54] ALL-FIBER ACOUSTO-OPTIC TUNABLE FILTER

[75] Inventors: Byoung Yoon Kim, Taejon; Hyo Sang Kim, Cheonju; Seok Hyun Yun; In Kag Hwang, both of Taejon, all of Rep. of Korea

[73] Assignee: Korea Advanced Institute of Science and Technology, Taejon, Rep. of Korea

[21] Appl. No.: 09/022,413

[22] Filed: Feb. 12, 1998

[30] Foreign Application Priority Data

Jun. 16, 1997 [KR] Rep. of Korea ................ 97-24796

[51] Int. Cl.[7] .................................................. G02B 6/26
[52] U.S. Cl. ........................ 385/28; 385/7; 385/27; 385/29; 385/31; 385/39; 385/42
[58] Field of Search .................... 385/7, 15, 27, 385/28, 29, 39, 42, 47, 31

[56] References Cited

U.S. PATENT DOCUMENTS

| | | | |
|---|---|---|---|
| 4,068,191 | 1/1978 | Zemon et al. | 385/28 X |
| 4,828,350 | 5/1989 | Kim et al. | 385/28 X |
| 4,832,437 | 5/1989 | Kim et al. | 385/28 X |
| 4,915,468 | 4/1990 | Kim et al. | 385/28 X |
| 5,007,705 | 4/1991 | Morey et al. | 385/28 X |
| 5,708,736 | 1/1998 | Steinblatt | 385/28 |

OTHER PUBLICATIONS

"Single–mode–fiber acousto–optic tunable notch filter with variable spectral profile", Hyo Sang Kim et al., Optical Fiber Communication Conference, Optical Society of America Technical Digest Series, vol. 6, pp. PD7–1–4, 1997.

Frangen, et al. Integrated Optical Acoustically Tunable Wavelength Filter; Electronics Letters, vol. 25, Iss. No. 23, pp. 1583–1584, 1989.

Vengsarkar et al. Long–Period Fiber–Grating–Based Gain Equalizers, Optics Letters, vol. 21, No. 5, pp. 336–338, 1996.

Tian, F. et al. Interchannel Interference in Multiwavelength Operation of Integrated Acousto–Optical Filters and Switches, Jounal of LightwaveTechnology, vol. 13, No. 6, pp. 1146–1154, 1995.

Kim, B.Y., et al., All–Fiber Acousto–Optic Frequency Shifter, Optics Letters, vol. 11 No. 6, pp. 389–391, 1986.

Birks, T.A., Low Power Acousto–Optic Device Based on a Tapered Single–Mode Fiber, Photonics Technology Letters, vol. 6, No. 6, pp. 725–727, 1994.

*Primary Examiner*—Brian Healy
*Attorney, Agent, or Firm*—Oliff & Berridge, PLC

[57] ABSTRACT

This invention relates to an all-fiber acousto-optic tunable wavelength filter which is useful in optical communications or optical fiber sensor systems. The present invention provides an all-fiber acousto-optic tunable filter, comprising: a length of optical fiber for propagating optical waves; a first mode converting means for selectively converting a core mode of the optical wave propagating in said optical fiber into a cladding mode by means of acoustic wave, depending on the wavelength of the optical wave; and a mode selecting means for selecting one or more mode among the core modes and cladding modes. In the embodiment of the invention, the mode selecting means may be configured to be a length of optical fiber whose jacket is partially stripped and a flexural acoustic wave generator to which electrical signal with a plurality of frequency components is applied. According to the invention, the wavelength filters provides a wide tuning range and can electrically control its filtering feature.

11 Claims, 5 Drawing Sheets

ALL-FIBER ACOUSTO-OPTIC TUNABLE FILTER

BACKGROUND OF THE INVENTION

1. Field of the Invention

The present invention relates to an acousto-optic tunable filter, more particularly to an all-fiber acousto-optic tunable wavelength filter which is useful in optical communications or optical fiber sensor systems.

2. Description of the Prior Art

Wavelength filters have wavelength-dependent transmittance, so that they play an important role in many optical systems. Especially, as optical communications and optical fiber sensor systems are rapidly developed, wavelength filters have been actively studied as they are suitable for the selection of desired wavelength or gain flattening of optical amplifiers.

The wavelength filters used in optical communications or optical fiber sensor systems can be grouped into insertion type filter and all-fiber type filter based on the filtering device.

The insertion type filter is manufactured by connecting optical fiber to the integrated optical device which integrates filtering structure in an optical crystal or the like. An example of such a device is discussed under the article "Integrated optical acoustically tunable wavelength filter" by J. Frangen et al. in Electronics Letters 1989, Vol. 25, Iss 23, pp. 1583–1584. In the article, acousto-optic tunable filter is manufactured by forming light waveguides on a lithium niobate($LiNbO_3$) single crystal substrate. However, in this insertion type filter, optical fiber should be connected to integrated optical device, as there is considerable loss at the connected portion, which results in great loss for the passing signal light. Moreover, since some integrated optical devices show significant polarization dependence, the intensity of the output light after passing through the devices may change considerably according to the polarization state of the input light.

All-fiber type filters have filtering effect using the relation between modes of propagating light in optical fiber, providing low connection loss compared with the insertion type filter.

Publications relating to such all-fiber type filters include the article "Long-period fiber-grating based gain equalizers" by A. M. Vengsarkar et al. in Optics Letters, Vol. 21, No. 5, p. 336, 1996. In this article, the long-period grating filter is provided by periodically varying the refractive index of the core within single mode optical fiber. The advantages of this filter are that there is almost no connection loss or characteristic variation depending on the polarization state of input light. Another advantage of this filter is that desirable filters are manufactured by adjusting the periodicity of refractive index variation of the optical fiber core. However, once the filter is manufactured, the wavelength characteristic of the filter cannot be changed easily.

Other prior arts relating to all-fiber type filters include a device using two mode optical fiber which is disclosed by B. Y. Kim et al. in the article "All-fiber acousto-optic frequency shifter" of Optics Letters, Vol. 11, p. 389, 1996 and U.S. Pat. No. 4,832,437. This device can preferably change the central wavelength of the filter, but one problem with this device is that the wavelength characteristic of the filter is extremely limited.

SUMMARY OF THE INVENTION

Therefore, it is an object of the present invention to provide an acousto-optic tunable filter capable of electrically controlling the transmittance characteristic of the filter at its central wavelength or within its operating wavelength band.

In order to accomplish the aforementioned object, the present invention provides an all-fiber acousto-optic tunable filter, comprising:

a length of optical fiber for propagating optical waves;

a first mode converting means for selectively converting a core mode of the optical wave propagating in the optical fiber into a cladding mode by means of acoustic wave, depending on the wavelength of the optical wave; and a mode selecting means for selecting one or more mode among the core modes and cladding modes.

The mode converting means includes a flexural acoustic wave generator for generating flexural acoustic wave in the optical fiber, and preferably the flexural acoustic wave generator is an acoustic transducer which generates flexural acoustic wave in response to the electric signal input to the acoustic transducer.

The acoustic transducer may comprise a piezoelectric transducer for generating acoustic wave by electric signal input; and an acoustic horn for guiding the acoustic wave to a predetermined direction. In that case, the piezoelectric transducer vibrates in a shear mode to generate acoustic waves in the optical fiber. The piezoelectric transducer and acoustic horn have holes through which the optical fiber passes.

The acoustic transducer can vary the amplitude and wavelength of the flexural acoustic wave by adjusting the frequency and amplitude of the input electric signal which has a plurality of frequency components.

Each frequency component of the input electric signal converts the core mode of the optical wave into different cladding modes.

The mode selecting means can be configured to be a length of optical fiber with its jacket partially stripped.

The mode selecting means may include a second mode converting means that converts one or more cladding modes to core modes of an optical fiber. In that case, the second mode converting means may convert one or more cladding modes to core modes of an optical fiber by means of is acoustic wave.

Hereinafter, the propagation of optical wave through optical fiber will be briefly described for detailed description of a preferred embodiment of the invention.

In principle, optical wave propagates through the core of optical fiber as it totally reflects at an interface between the core and cladding of the optical fiber. On the other hand, the optical wave has difficulty in propagating through the cladding of the optical fiber because the jacket surrounding the cladding is highly absorptive and its refractive index is higher than that of the cladding, which causes strong attenuation.

However, if the jacket is stripped, that is, if the cladding is exposed in the air, optical wave can propagate farther since it is totally reflected at the interface between the cladding and air due to the higher refractive index of the cladding than that of air.

Therefore, there exist two principal modes of optical waves which propagate along a bare section of optical fiber since each mode satisfies different total reflection conditions.

The mode of optical wave which propagates satisfying the total reflection condition at the interface of core and cladding is called "core mode". On the other hand, the mode of optical wave which propagates satisfying the total reflection condition at the boundary surface of cladding and surrounding air, while failing to satisfy the total reflection condition at core/cladding interface, is called "cladding mode".

Most of the energy of the core mode is distributed in the core, and that of the cladding mode in the cladding.

The propagation constants of the above described propagating is modes are different, and they satisfy the following inequality.

$$\beta_{co} > n_{cl}k > \beta_{cl}$$

wherein $\beta_{co}$ represents the propagation constant of the core mode, $\beta_{cl}$ that of the cladding mode, k that of optical wave propagating in the vacuum, and $n_{cl}$ the refractive index of the cladding, respectively.

In principle, there exists only one core mode for optical wave propagating along general single mode optical fiber used for optical communication. However, there exist one core mode and a plurality of cladding modes for optical wave propagating along a bare section of single mode optical fiber.

The operation of all-fiber acousto-optic tunable wavelength filter according to the present invention is based on the fact that the light in core mode can be converted to the light in cladding mode.

BRIEF DESCRIPTION OF THE DRAWINGS

The detailed description particularly refers to the accompanying drawings in which.

DETAILED DESCRIPTION OF THE PREFERRED EMBODIMENTS

Hereinafter, preferred embodiments of the present invention will be described referring to the accompanying drawings.

Figure 1:
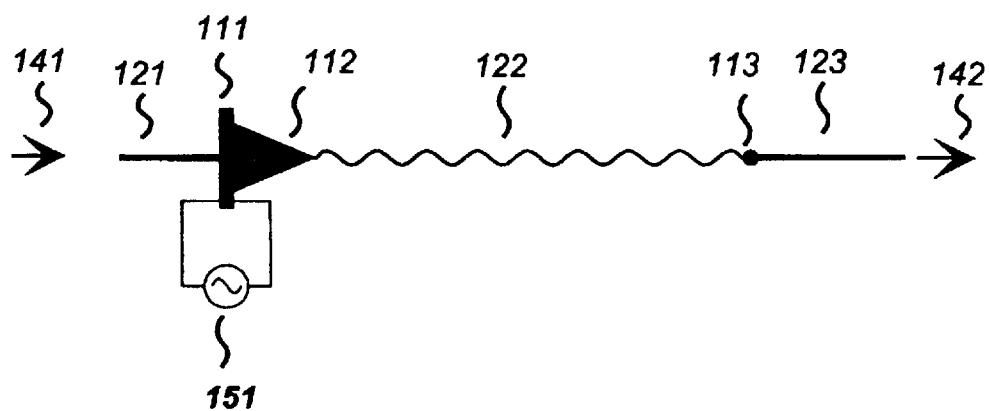
FIG. 1 is a schematic view showing the structure of acousto-optic tunable filter according to the embodiment of the present invention.

FIG. 1 is a schematic view showing the structure of acousto-optic tunable filter according to the embodiment of the present invention.

The wavelength filter comprises a length of optical fiber 121, 123 with jacket and another length of optical fiber 122 without jacket which are respectively formed by partially stripping the jacket of optical fiber. The filter also comprises a flexural acoustic wave generator 111 for generating flexural acoustic wave in the optical fiber. Flexural acoustic wave generator 111 is a device for generating flexural acoustic wave by converting electric signals to mechanical vibrations. The generator is composed of a PZT(Piezoelectric Transducer) device 111 and an acoustic horn 112 which guides generated flexural acoustic wave to its propagating direction and amplifies the amplitude of the flexural acoustic wave by concentrating the generated flexural acoustic wave on a small spot.

It is desirable that both PZT device 111 and acoustic horn 112 have holes through which optical fiber 122 passes, which enables the generator to generate flexural acoustic waves efficiently with simple and rugged configuration.

The operation of the wavelength filter is as follows.

If electric signal 151 with constant frequency "f" is applied to flexural acoustic wave generator, flexural acoustic wave having the same frequency "f" is generated. The flexural acoustic wave is transferred to optical fiber 122 and propagates along the optical fiber, finally absorbed in acoustic damper 113. The flexural acoustic wave propagating along optical fiber 122 produces periodic microbending along the fiber, resulting in the periodic change of effective refractive index which the optical wave propagating along the optical fiber experiences. The signal light propagating along the fiber in a core mode can be converted to a cladding mode by the change of effective refractive index in the optical fiber.

When signal light 141 is introduced into the wavelength filter according to the present invention, part of the signal light is converted to cladding mode due to the effect of the acoustic wave and the remainder of the signal light propagates as a core mode while the signal light propagates along optical fiber 122 whose jacket is stripped. The signal light converted to a cladding mode cannot propagate any longer in optical fiber 122 with jacket because the light is partly absorbed in the optical fiber or partly leaks from the optical fiber. Though a mode stripper is exemplified in this embodiment as a mode selecting means, any other mode selecting means, including a mode conversion means between core modes and cladding modes, can be used for the wavelength filter of the invention. For example, the long-period grating described in the article "Long-period fiber-grating based gain equalizers" by A. M. Vengsarkar et al. in Optics Letters, Vol. 21, No. 5, p. 336, 1996 can be used as the mode selecting means. As an another example, a mode coupler, which converts one or more cladding modes of one fiber to core modes of the same fiber or another fiber, can also be used.

Figure 2A:
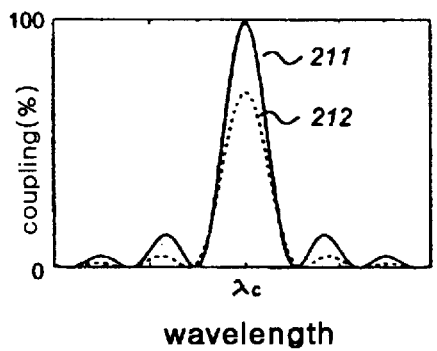
FIGS. 2(A)–(B) is a graph showing the coupling and transmittance of the acousto-optic tunable filter according to the embodiment of the present invention.

On one hand, the coupling amount converted to cladding mode is dependent on the wavelength of the input signal light. FIG. 2A shows the coupling amounts as functions of wavelength when flexural acoustic waves with different amplitudes are induced in the optical fiber. As shown in FIG. 2A, the coupling amounts are symmetrical with same specific wavelength line($\lambda_c$), i.e. center wavelength line, however they show different results 211 and 212 due to the amplitude difference of the flexural acoustic waves. Therefore, since the transmittance of the output light 142 which has passed through the wavelength filter of FIG. 1 is different depending on the wavelength of the input light, the wavelength filter can act as a notch filter which filters out input light with specific wavelength as shown in FIG. 2B.

Figure 2B:
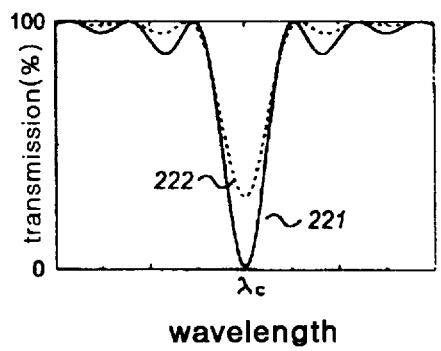

FIG. 2B is a graph showing the transmittances as a function of wavelength when flexural acoustic waves with different amplitudes are induced in the filter. The respective transmittances have same center wavelength as does the coupling amount, but different transmittance characteristic 221 and 222 depending on the amplitude difference of the flexural acoustic waves can be shown.

The center wavelength $\lambda_c$ of the filter satisfies the following equation.

$$\beta_{co}(\lambda) - \beta_{cl}(\lambda) = 2\pi/\lambda_a$$

In the above equation, $\beta_{co}(\lambda)$ and $\beta_{cl}(\lambda)$ are propagation constants of core mode and cladding mode in the optical fiber which are respectively dependent on the wavelength, and $\lambda_a$ represents the wavelength of the flexural acoustic waves.

Accordingly, if the frequency of the electric signal applied to the flexural acoustic wave generator varies, the wavelength of the acoustic wave generated in the optical fiber also varies, which results in the center wavelength change of the filter. In addition, since the transmission is dependent on the amplitude of the flexural acoustic wave, the transmission of signal light can be adjusted by varying the amplitude of the electric signal which is applied to the flexural acoustic wave generator.

Figure 3:
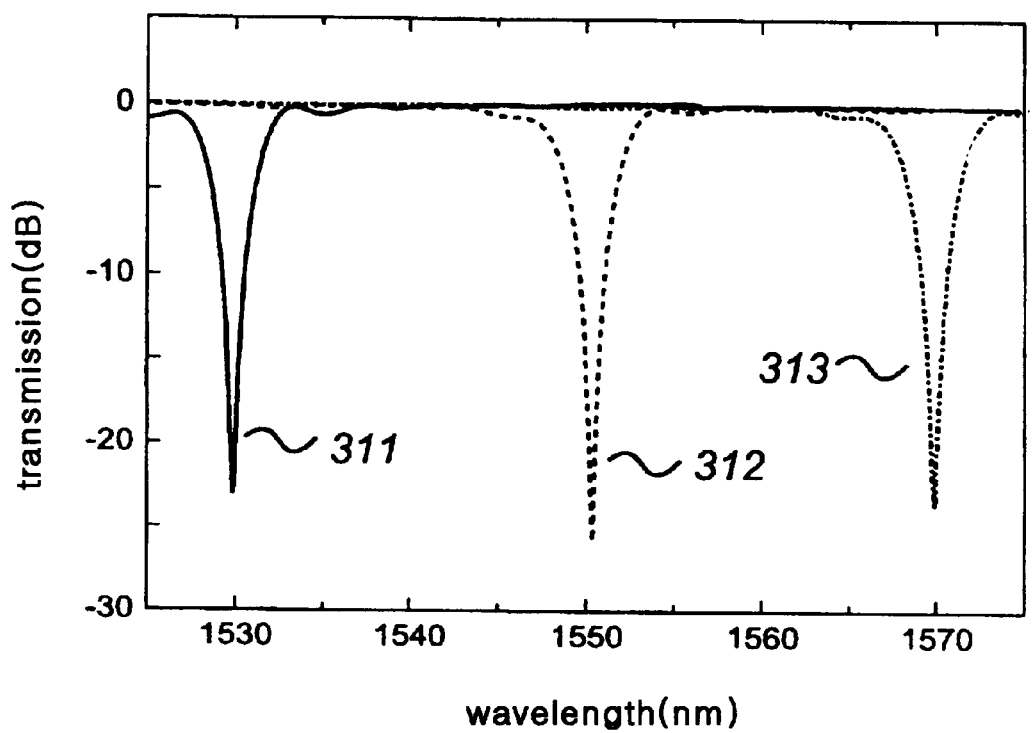
FIG. 3 is a graph showing the transmittance of the acousto-optic tunable filter according to the embodiment of the present invention.

FIG. 3 is a graph showing the transmittance of the acousto-optic tunable filter according to the embodiment of the present invention when different electric signal frequencies are applied. As shown in FIG. 3, each center wavelength (i.e. wavelength showing maximum attenuation) of the wavelength filter for different electric signals was 1530 nm, 1550 nm and 1570 nm. Therefore the center wavelength of the wavelength filter according to the embodiment is changed by varying the frequency of the electric signal which is applied to the flexural acoustic wave generator.

Figure 4:
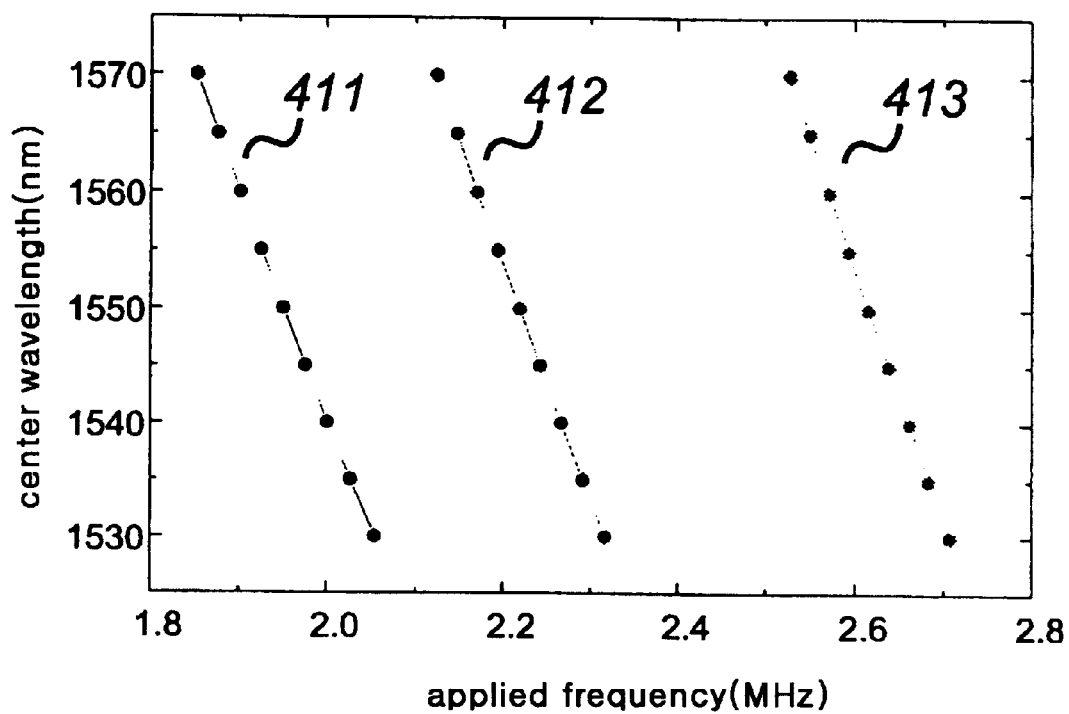
FIG. 4 is a graph showing the center wavelength of the wavelength filter according to the embodiment of the invention as a function of the frequency applied to the flexural acoustic wave generator.

As described above, since there are a plurality of cladding modes in the bare section of the optical fiber, the core mode can be coupled to several cladding modes. FIG. 4 is a graph showing the center wavelength of the wavelength filter according to the embodiment of the invention as a function of the frequency applied to the flexural acoustic wave generator. In FIG. 4, straight lines 411, 412 and 413 represent the center wavelength of the wavelength filter resulting from the coupling of a core mode with three different cladding modes.

Referring to FIG. 4, there are three applied frequencies for any one optical wavelength in this case. Therefore the input signal light is converted to a plurality of cladding modes by applying multi-frequency electric signal to the flexural acoustic wave generator. Moreover, it means transmission characteristics of the filter can be electrically controlled by adjusting the amplitude and each frequency component of the electric signal.

Figure 5A:
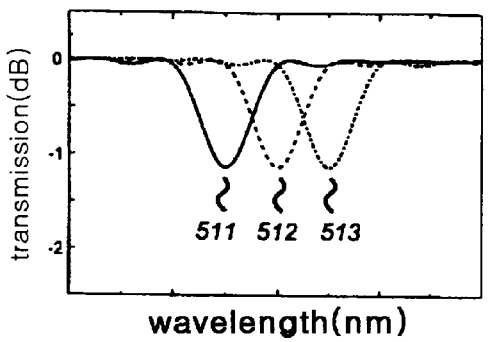
FIGS. 5(A)–(D) is a graph for describing the fundamental of tunable transmittance of the wavelength filter according to the embodiment of the invention.
Figure 5B:
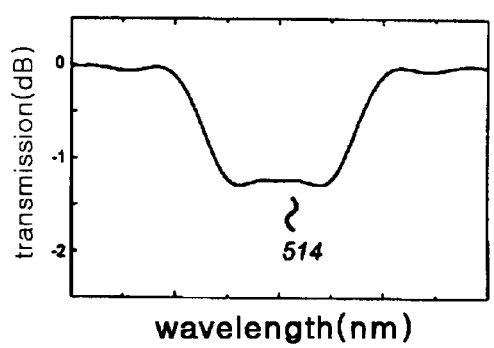

As shown in FIG. 5A, the respective transmission features 511, 512 and 513 of a filter can be provided by applied electric signals with different frequencies f1, f2 and f3. In this example, assuming that f1 couples the core mode of input signal light to a cladding mode(cladding mode A), f2 couples the core mode to other cladding mode(cladding mode B) and f3 couples the core mode to another cladding mode different from A or B(cladding mode C), the transmission feature is shown in FIG. 5B as a curve 514 when electric signal with three frequency components f1, f2 and f3 is applied to the flexural acoustic wave generator.

Figure 5C:
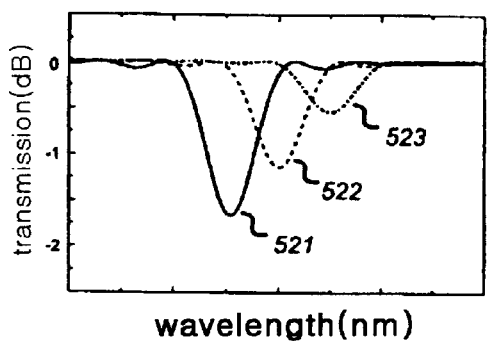
Figure 5D:
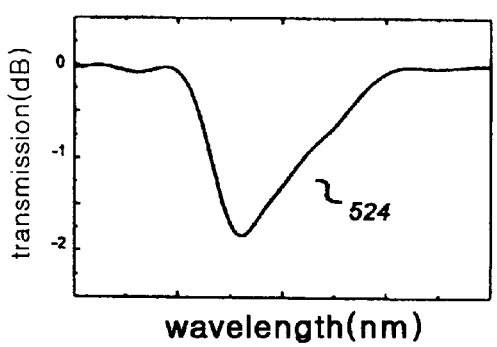

Likewise, as shown in FIG. 5C, if a wavelength filter has transmission feature curves 521, 522 and 523 corresponding to respective frequencies f1', f2' and f3' and electric signal having three frequency components f1', f2' and f3' is applied to the flexural acoustic wave generator, the transmission feature of the wavelength filter is shown as a curve 524 of FIG. 5D.

Figure 6A:
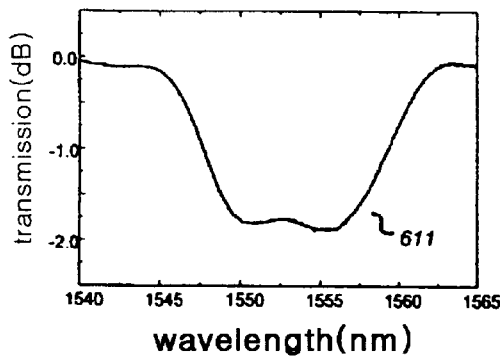
FIGS. 6(A)–(B) is a graph showing the transmittance characteristic of the wavelength filter according to the embodiment of the present invention, when varying electric signal having three frequency components is applied to the filter.
Figure 6B:
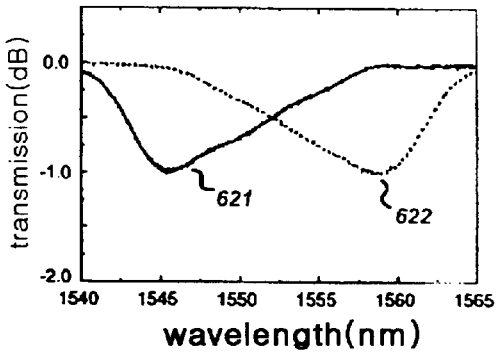

FIG. 6 is a graph showing the transmittance of the wavelength filter according to the embodiment of the present invention, when varying electric signal having three frequency components is applied to the filter. Referring to FIG. 6, when varying electric signal having a plurality of frequency components is applied to the flexural acoustic wave generator of the filter, various shapes of transmittance curves 611, 621 and 622 can be obtained as shown in FIG. 6A and 6B.

On the other hand, since conventional tunable wavelength filters utilize the coupling of only two modes, the difference between a plurality of applied frequencies naturally becomes small to obtain wide wavelength band filtering feature by applying a plurality of frequencies. In this case, as described under the article "Interchannel Interference in multiwavelength operation of integrated acousto-optical filters and switches" by F. Tian and H. Herman in Journal of Light wave technology 1995, Vol. 13, n 6, pp. 1146–1154, when signal light input to a filter is simultaneously converted into same (polarization) mode by various applied frequency components, the output signal light may undesirably be modulated with frequency corresponding to the difference between the applied frequency components. However, with the wavelength filter of the present invention, the above problem can be circumvented, because the respective frequency components convert the mode of input light into different cladding modes in the filter.

Therefore, the method that provides various filtering features by applying a plurality of frequencies to the flexural acoustic wave generator to convert a core mode of input signal light into a plurality of cladding modes gives better result compared with the conventional method that applies a plurality of frequencies to the flexural acoustic wave generator to convert core mode of input signal light into only one other mode.

Figure 7A:
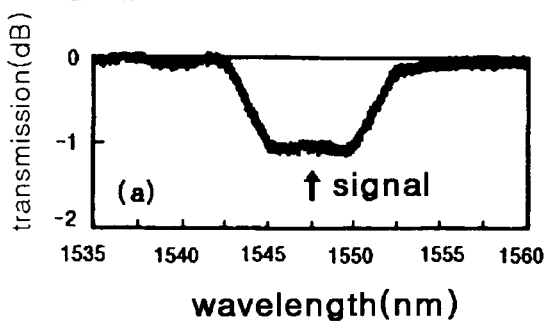
FIGS. 7(A)–(D) is a graph for comparing the mode converting characteristic of the wavelength filter according to the embodiment of the present invention with that of a conventional wavelength filter.

To verify this, inventors made the following experiment. At first, the filtering feature shown in FIG. 7A was obtained by applying adjacent frequencies 2.239 MHz and 2.220 MHz to reproduce the result of conventional method. The applied two frequencies were such that convert the mode of input light into the same cladding mode. Under the condition, narrow wavelength-band signal light with center wavelength of 1547 nm was input to the filter to measure output light. Referring to the measurement result shown in FIG. 7B, there is an undesirable modulated signal with frequency corresponding to the difference of the two applied frequencies.

Figure 7C:
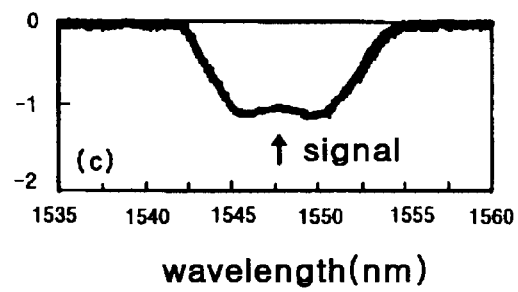
Figure 7B:
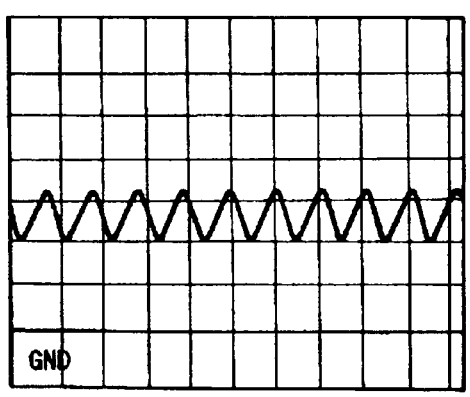

On the other hand, when adjacent frequencies 2.239 MHz and 2.220 MHz were applied to the flexural acoustic wave generator of the wavelength filter according to the embodiment of the invention, the two frequency components convert the mode of input light into mutually different cladding modes. FIG. 7C shows the measurement result when the same signal light as the above experiment was input to the filter and output light was measured.

Figure 7D:
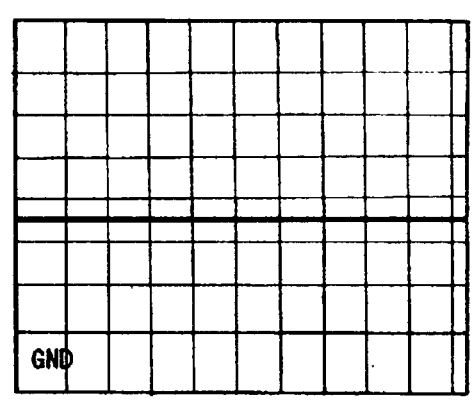

However, undesirable modulated signal, which appeared in a conventional filter, practically disappeared as shown in FIG. 7D.

In optical communications or optical fiber sensor systems, wavelength filters are required that has a wide tuning range and are capable of electrically controlling its filtering feature. The all-fiber acousto-optic tunable wavelength filter of the present invention satisfies the requirement.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An acousto-optic filter, comprising:

a single mode optical fiber with a longitudinal axis, a single core mode, a core and a cladding in a surrounding relationship to core, the single mode optical fiber having length selected to generate microbending in the single mode optical fiber to couple core to cladding modes;

an acoustic wave propagation member with a proximal end and a distal end, the distal end being coupled to the single mode optical fiber to launch a flexural acoustic wave that generates periodic microbends in the optical fiber; and at least one acoustic wave generator coupled to the proximal end of the acoustic wave propagation member, wherein a wavelength of an optical signal coupled to the cladding from the core of the single mode optical fiber is changed by varying the frequency of a signal applied to the acoustic wave generator.

2. The filter of claim 1, wherein the acoustic wave propagation member is mechanically coupled to the optical fiber.

3. The filter of claim 1, wherein the acoustic wave propagation member has an elongated geometric configuration.

4. The filter of claim 1, wherein the acoustic wave propagation member is tapered from the proximal to the distal ends.

5. The filter of claim 1, wherein the acoustic wave propagation member has a conical geometric configuration.

6. The filter of claim 1, wherein the acoustic wave propagation member has a longitudinal axis that is parallel to the longitudinal axis of the optical fiber.

7. The filter of claim 1, wherein the acoustic wave propagation member includes an interior with an optical fiber receiving channel.

8. The filter of claim 1, wherein the acoustic wave propagation member is a unitary structure.

9. The filter of claim 1, wherein the acoustic wave generator produces multiple acoustic signals with individual controllable strengths and frequencies.

10. An filter of claim 1, wherein the single mode optical fiber has multiple cladding modes.

11. The filter of claim 10, wherein the acoustic wave generator produces multiple acoustic signals with individual controllable strength and frequencies, and each of the acoustic signals provides a coupling between the core mode and a different cladding mode.

* * * * *